(12) United States Patent
Ohtsuka et al.

(10) Patent No.: US 8,194,120 B2
(45) Date of Patent: Jun. 5, 2012

(54) IMAGE CAPTURING APPARATUS, DISPLAY APPARATUS, IMAGE CAPTURING METHOD, DISPLAYING METHOD AND PROGRAM THEREFOR

(75) Inventors: Shuichi Ohtsuka, Kanagawa (JP); Kazuo Shiota, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 1770 days.

(21) Appl. No.: 11/442,174

(22) Filed: May 30, 2006

(65) Prior Publication Data

US 2006/0280448 A1   Dec. 14, 2006

(30) Foreign Application Priority Data

May 30, 2005   (JP) ................................. 2005-157783

(51) Int. Cl.
 *H04N 7/18*   (2006.01)
(52) U.S. Cl. ........................................................ 348/64
(58) Field of Classification Search .............. 348/64–68, 348/70, 112; *H04N 7/18*
See application file for complete search history.

(56) References Cited

U.S. PATENT DOCUMENTS

| | | | |
|---|---|---|---|
| 6,307,550 B1 * | 10/2001 | Chen et al. .................... | 345/418 |
| 6,891,539 B1 * | 5/2005 | Maruyama et al. ........... | 345/629 |
| 7,580,066 B2 * | 8/2009 | Shirakawa .................... | 348/239 |
| 8,004,593 B2 * | 8/2011 | Kusaka ..................... | 348/333.02 |
| 2005/0146621 A1 * | 7/2005 | Tanaka et al. .............. | 348/211.2 |

FOREIGN PATENT DOCUMENTS

JP   2003-78859 A   3/2003

* cited by examiner

*Primary Examiner* — Tung Vo
(74) *Attorney, Agent, or Firm* — Sughrue Mion, PLLC

(57) ABSTRACT

It is possible to appropriately select an image important for a user than ever before among various images taken by an image capturing apparatus. An image capturing apparatus that records a plurality of captured images and an album information file for designating a display order making a display apparatus display at least one the captured image in a recording medium as files different from each other. The image capturing apparatus includes: an operation acquiring section that acquires an operation before or after a user of the image capturing apparatus takes the captured images; and an operation recording section that records operation information showing the operation in the album information file in order to displays the captured image with a level of importance according to the operation before or after capturing the captured image, in association with the captured image to be displayed on the display apparatus.

1 Claim, 11 Drawing Sheets

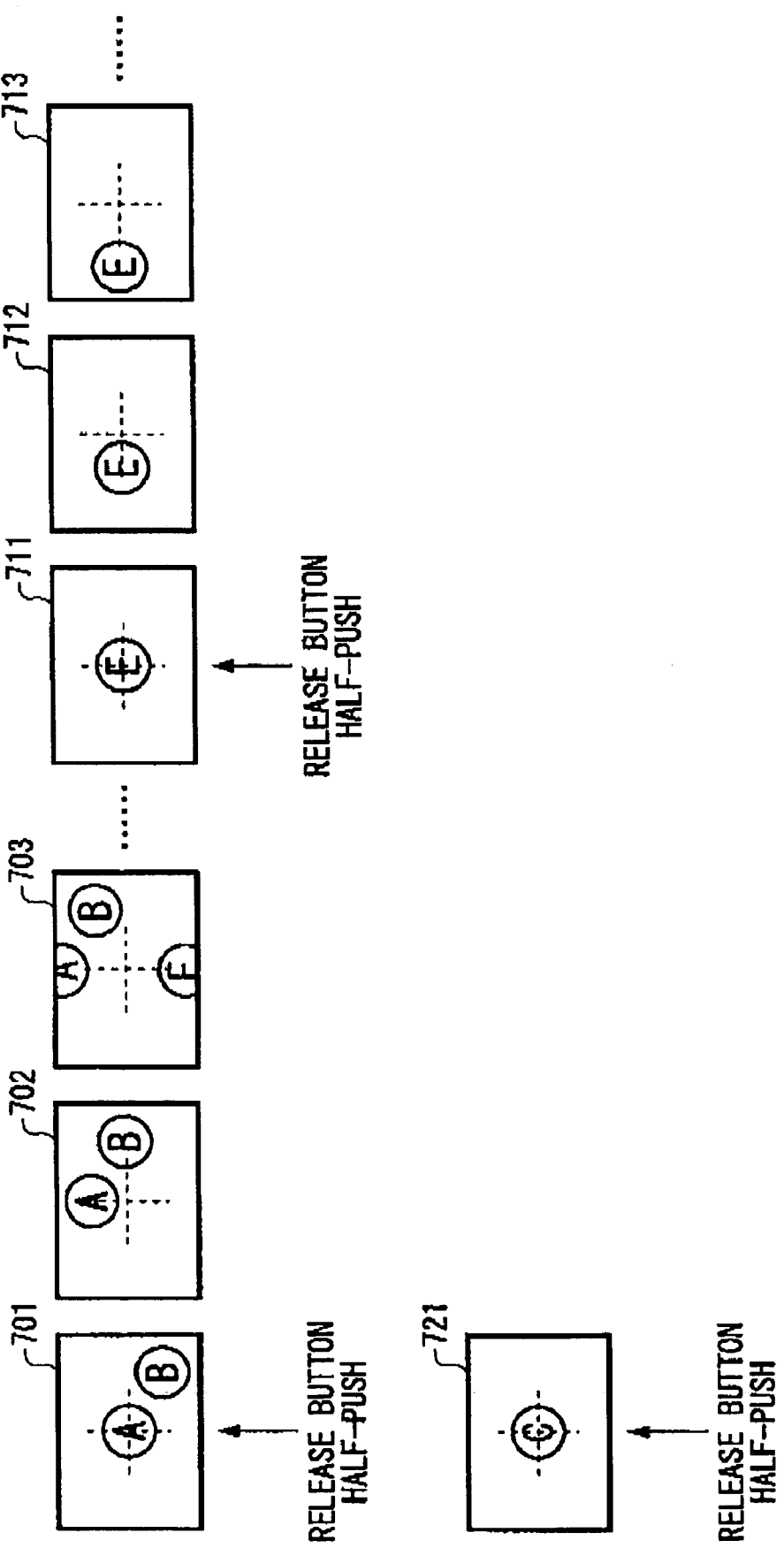

IMAGE CAPTURING APPARATUS, DISPLAY APPARATUS, IMAGE CAPTURING METHOD, DISPLAYING METHOD AND PROGRAM THEREFOR

CROSS REFERENCE TO THE RELATED APPLICATION

This patent application claims priority from a Japanese Patent Application No. 2005-157783 filed on May 30, 2005, the contents of which are incorporated herein by reference.

BACKGROUND OF THE INVENTION

1. Field of the Invention

The present invention relates to an image capturing apparatus, a display apparatus, an image capturing method, a displaying method, and a program therefor. More particularly, the present invention relates to an image capturing apparatus, a display apparatus, an image capturing method, a displaying method, and a program for recording additional information in association with image data of a captured image.

2. Description of Related Art

In recent years, since digital cameras and high-capacity recording media are available at relatively low cost, it has been generalized to take a large number of images even in the case of individual use in addition to a business purpose. For this reason, snap photographs and scenery photographs that have been taken may include unnecessary photographs due to failed capturing in addition to photographs to be preserved in an album. In such a case, a user had conventionally to put only necessary photographs by hand in the album after looking at all the captured photographs.

In this regard, a technique for recording image data of a captured image in association with a parameter set in an image capturing apparatus during capturing the image is proposed as disclosed, for example, in Japanese Patent Application Publication No. 2003-78859. According to this technique although a large number of images are taken, it is possible to automatically classify images based on the parameter.

In the document, many conditions recorded during capturing an image are various kinds of parameters set in an image capturing apparatus such as white balance information, focus information, exposure information, or zoom information. Such parameters are important for an expert of image technology and an expert of an image processing in many cases. However, such parameters are not an index judging the significance of photograph based on the subjectivity for a general user in many cases.

SUMMARY OF THE INVENTION

Therefore, it is an object of the present invention to provide an image capturing apparatus, a display apparatus, an image capturing method, a displaying method, and a program that can solve the foregoing problems. The above and other objects can be achieved by combinations described in the independent claims. The dependent claims define further advantageous and exemplary combinations of the present invention.

To solve the problem, according to the first aspect of the present invention, there is provided an image capturing apparatus that records a plurality of captured images and an album information file for designating a display order making a display apparatus display at least one the captured image in a recording medium as files different from each other. The image capturing apparatus includes: an operation acquiring section that acquires an operation before or after a user of the image capturing apparatus takes the captured images; and an operation recording section that records operation information showing the operation in the album information file in order to displays the captured image with a level of importance according to the operation before or after capturing the captured image, in association with the captured image to be displayed on the display apparatus.

Moreover, the operation acquiring section may specify a focused subject according to a focusing operation of the user, and the operation recording section may record the operation information specifying the focused subject in the album information file. Moreover, the operation acquiring section may specify a subject enlarged before or after image capturing according to a zoom-in operation after the image capturing by the user or a zoom-out operation before the image capturing, and the operation recording section may record the operation information specifying the enlarged subject in the album information file.

Moreover, the operation acquiring section may specify a subject caught in the center of an image capturing area by changing the direction of image capturing apparatus by the user before or after image capturing, among a plurality of subjects included in the captured image, and the operation recording section may record the operation information showing the subject specified by the operation acquiring section in the album information file. Moreover, the operation acquiring section may acquire a time from the determination of composition of the captured image taken by the user to when the captured image is taken, and the operation recording section may record the time acquired by the operation acquiring section in the album information file as the operation information.

Moreover, the operation acquiring section may acquire a time from the turning on of a power source of the image capturing apparatus to when the captured image is taken, and the operation recording section may record the time acquired by the operation acquiring section in the album information file as the operation information. Moreover, the operation recording section may record, in the album information file, information for the operation from a predetermined time prior to a captured time instant of the captured image to the captured time instant or the operation from the captured time instant to a predetermined time posterior to the captured time instant.

Moreover, the image capturing apparatus may further include: an image-in-operation acquiring section that acquires an image-in-operation while the user operates the image capturing apparatus before or after taking the captured image; and an image comparing section that compares the captured image and the image-in-operation, and the operation recording section may record the information of the operation in the album information file on condition that a degree of coincidence between a subject of the captured image and a subject of the image-in-operation is not less than a predetermined reference value. Moreover, the image capturing apparatus may flirter include a focusing section that focuses the captured image to be taken, and the operation acquiring section may acquire information showing a distance from each of a plurality of focus positions within an image capturing area to a subject, as the operation information.

The image capturing apparatus may further include: an image-in-operation acquiring section that continuously acquires a plurality of image-in-operations while the user operates the image capturing apparatus before or after capturing the captured image; and an image comparing section that compares image contents of the plurality of image-in-operations acquired by the image-in-operation acquiring section to compute a degree of coincidence between the plurality of image-in-operations, and the operation recording section may record operation information snowing the operation in the album information file while an image-in-operation in which the degree of coincidence computed from the image comparing section is not less than a predetermined reference value is taken.

The image capturing apparatus may further include an instruction inputting section that accepts instruction input for the image capturing apparatus from the user, and the operation acquiring section may acquire operations from a timing at which the instruction inputting section accepts the instruction input to a timing at which the captured image is taken.

The operation recording section may record the operation information showing the subject specified by the operation acquiring section in the album information file, in order to display the subject specified by the operation acquiring section more emphatically than other subjects.

According to the second aspect of the present invention, there is provided an image capturing apparatus that records a plurality of captured images and an album information file for designating a display order making a display apparatus display at least one the captured image in a recording medium as files different from each other. The image capturing apparatus includes: an operation acquiring section that acquires a rotating operation of the image capturing apparatus round an image capturing area, the rotating operation being performed by a user of the image capturing apparatus from before the captured image is taken; and an operation recording section that records operation information showing the rotating operation in the album information file in order to rotate and display the captured image by a rotation amount of the image capturing apparatus according to the rotating operation from before the captured image is taken, in association with the captured image to be displayed on the display apparatus.

The image capturing apparatus may further include: an image-in-operation acquiring section that acquires an image-before-capturing before the user takes the captured image; and an image comparing section that compares the image-before-capturing acquired by the image-in-operation acquiring section and the captured image taken by the image capturing apparatus, the operation acquiring section may specify a rotation amount of the image capturing area from a timing at which an image-in-operation is taken to a timing at which the captured image is taken, based on the comparison result by the image comparing section, and the operation recording section may record the operation information specifying the rotation amount specified by the operation acquiring section in the album information file.

The image capturing apparatus may further include: an image-in-operation acquiring section that continuously acquires a plurality of image-in-operations before the user takes the captured image; and an image comparing section that compares a first image-in-operation and a second image-in-operation acquired by the image-in-operation acquiring section before the captured image is taken, the operation acquiring section may specify a rotation amount of the image capturing area in the range of a period in which a rotating operation is continuously performed between a timing before the captured image is taken and a timing at which the captured image is taken, based on the comparison result by the image comparing section, and the operation recording section may record the operation information specifying the rotation amount specified by the operation acquiring section in the album information file.

According to the third aspect of the present invention, there is provided a display apparatus that reads captured images and an album information file from a recording medium, which records a plurality of captured images and the album information file for designating a display order displaying at least one the captured image as files different from each other, in order to display at least one the captured image according to the display order. The display apparatus includes: an operation reading section that reads operations by a user of an image capturing apparatus before or after capturing the captured image, which are recorded in the album information file by the image capturing apparatus by which the captured image is taken in association with the captured image, for each of the captured images of which the display order is designated in the album information file; an importance level judging section that judges a level of importance of the captured image based on the operations; and a display section that displays each of at least one the captured image using a displaying method according to the level of importance.

Moreover, the display section may change at least one among the time displaying the captured image, the size displaying the captured image, and sound volume of a voice to be replayed during displaying the captured image, according to the level of importance.

According to the fourth aspect of the present invention, there is provided an image capturing method for recording a plurality of captured images taken by an image capturing apparatus and an album information file for designating a display order making a display apparatus display at least one the captured image in a recording medium as files different from each other. The image capturing method includes the steps of: acquiring an operation before or after a user of the image capturing apparatus takes the captured images; and recording information of the operation in the album information file in order to displays the captured image with a level of importance according to the operation before or after capturing the captured image, in association with the captured image to be displayed on the display apparatus.

According to the fifth aspect of the present invention, there is provided an image capturing method for recording a plurality of captured images and an album information file for designating a display order making a display apparatus display at least one the captured image in a recording medium as files different from each other. The image capturing method includes: an operation acquiring step of acquiring a rotating operation of the image capturing apparatus round an image capturing area, the rotating operation being performed by a user of an image capturing apparatus for taking the captured image from before the captured image is taken; and an operation recording step of recording operation information showing the rotating operation in the album information file in order to rotate and display the captured image by a rotation amount of the image capturing apparatus according to the rotating operation from before the captured image is taken, in association with the captured image to be displayed on the display apparatus.

According to the sixth aspect of the present invention, there is provided a displaying method for reading captured images and an album information file from a recording medium, which records a plurality of captured images taken by an image capturing apparatus and the album information file for designating a display order displaying at least one the captured image as files different from each other, in order to display at least one the captured image according to the display order. The displaying method includes the steps of: reading operations by a user of the image capturing apparatus before or after capturing the captured image, which are recorded in the album information file by the image capturing apparatus in association with the captured image, for each of the captured images of which the display order is designated in the album information file; judging a level of importance of the captured image based on the operations; and displaying each of at least one the captured image using a displaying method according to the level of importance.

According to the seventh aspect of the present invention, there is provided a program for controlling an image capturing apparatus that records a plurality of captured images and an album information file for designating a display order making a display apparatus display at least one the captured image in a recording medium as files different from each other. The program makes the image capturing apparatus function as: an operation acquiring section that acquires an operation before or after a user of the image capturing apparatus takes the captured images; and an operation recording section that records information of the operation in the album information file in order to displays the captured image with a level of importance according to the operation before or after capturing the captured image, in association with the captured image to be displayed on the display apparatus.

According to the eighth aspect of the present invention, there is provided a program for controlling an image capturing apparatus that records a plurality of captured images and an album information file for designating a display order making a display apparatus display at least one the captured image in a recording medium as files different from each other. The program makes the image capturing apparatus function as: an operation acquiring section that acquires a rotating operation of the image capturing apparatus round an image capturing area, the rotating operation being performed by a user of the image capturing apparatus from before the captured image is taken; and an operation recording section that records operation information showing the rotating operation in the album information file in order to rotate and display the captured image by a rotation amount of the image capturing apparatus according to the rotating operation from before the captured image is taken, in association with the captured image to be displayed on the display apparatus.

According to the ninth aspect of the present invention, there is provided a program for controlling a display apparatus that reads captured images and an album information file from a recording medium, which records a plurality of captured images taken by an image capturing apparatus and the album information file for designating a display order displaying at least one the captured image as files different from each other, in order to display at least one the captured image according to the display order. The program makes the display apparatus function as: an operation reading section that reads operations by a user of the image capturing apparatus before or after capturing the captured image, which are recorded in the album information file by the image capturing apparatus in association with the captured image, for each of the captured images of which the display order is designated in the album information file; an importance level judging section that judges a level of importance of the captured image based on the operations; and a display section that displays each of at least one the captured image using a displaying method according to the level of importance.

The summary of the invention does not necessarily describe all necessary features of the present invention. The present invention may also be a sub-combination of the features described above.

According to the present invention, it is possible to appropriately select an image important for a user than ever before among various images taken by an image capturing apparatus.

BRIEF DESCRIPTION OF THE DRAWINGS

The above and other objects and features and advantages of the present invention will become more apparent from the following description of the presently preferred exemplary embodiments of the invention taken in conjunction with the accompanying drawings, in which:

FIG. 7 is a view exemplary explaining a designated operation of a subject by a half-push of a release button.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
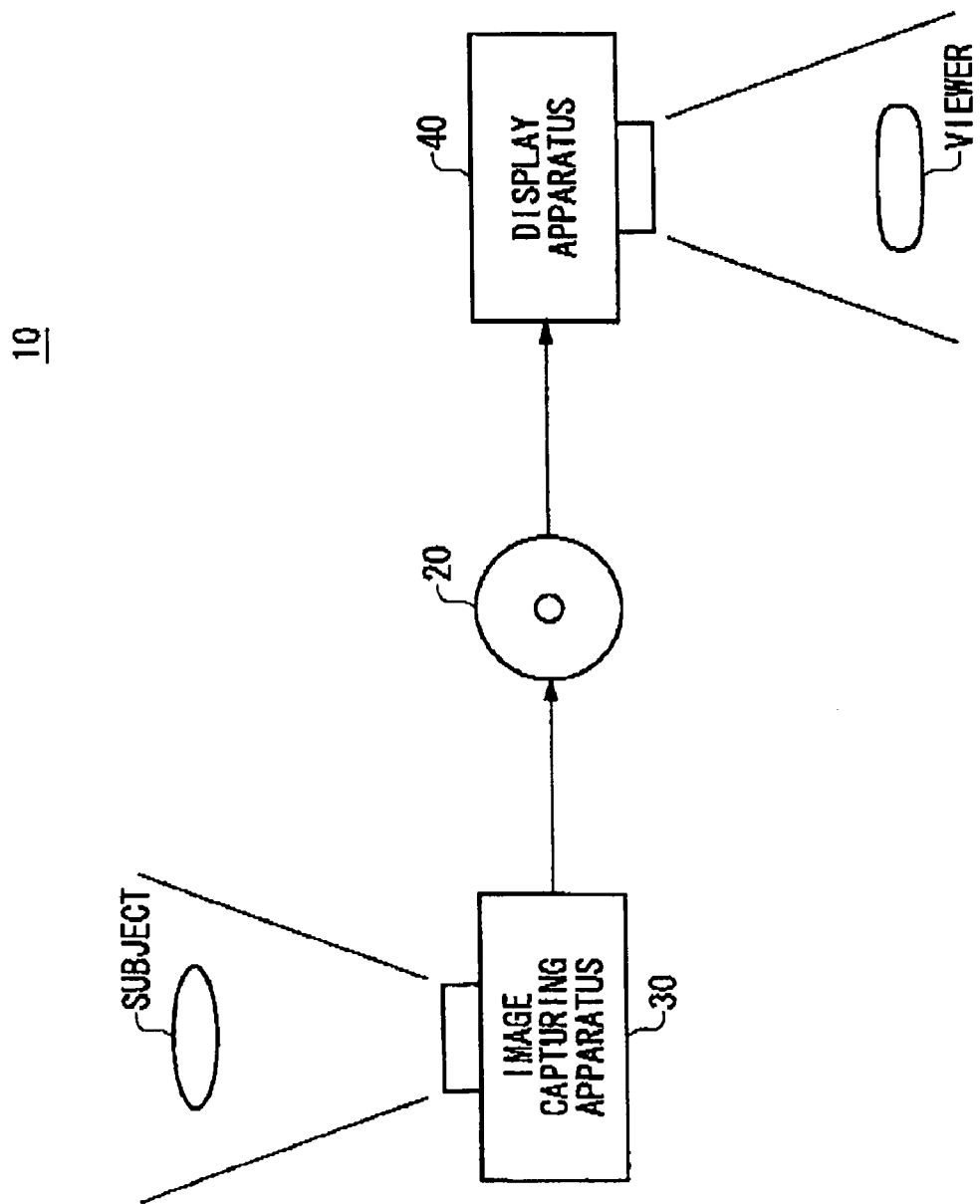
FIG. 1 is a view showing a total configuration of an image managing system.

FIG. 1 is a view showing a total configuration of an image managing system 10. The image managing system 10 has an image capturing apparatus 30 and a display apparatus 40. The image capturing apparatus 30 records image data of captured images in which subjects have been taken and an album information file for designating a display order making the display apparatus 40 display at least one the captured image, in a recording medium 20 as files different from each other. The display apparatus 40 reads captured images and an album information file from a recording medium, which records the plurality of captured images and the album information file for designating a display order displaying at least one the captured image as files different from each other, in order to display at least one the captured image according to the display order.

An object of the image managing system 10 in the present embodiment is to record various kinds of information necessary to determine a display order in, the recording medium 20 to appropriately select images important for a user. In addition, an image in the present embodiment may be a captured image.

Figure 2:
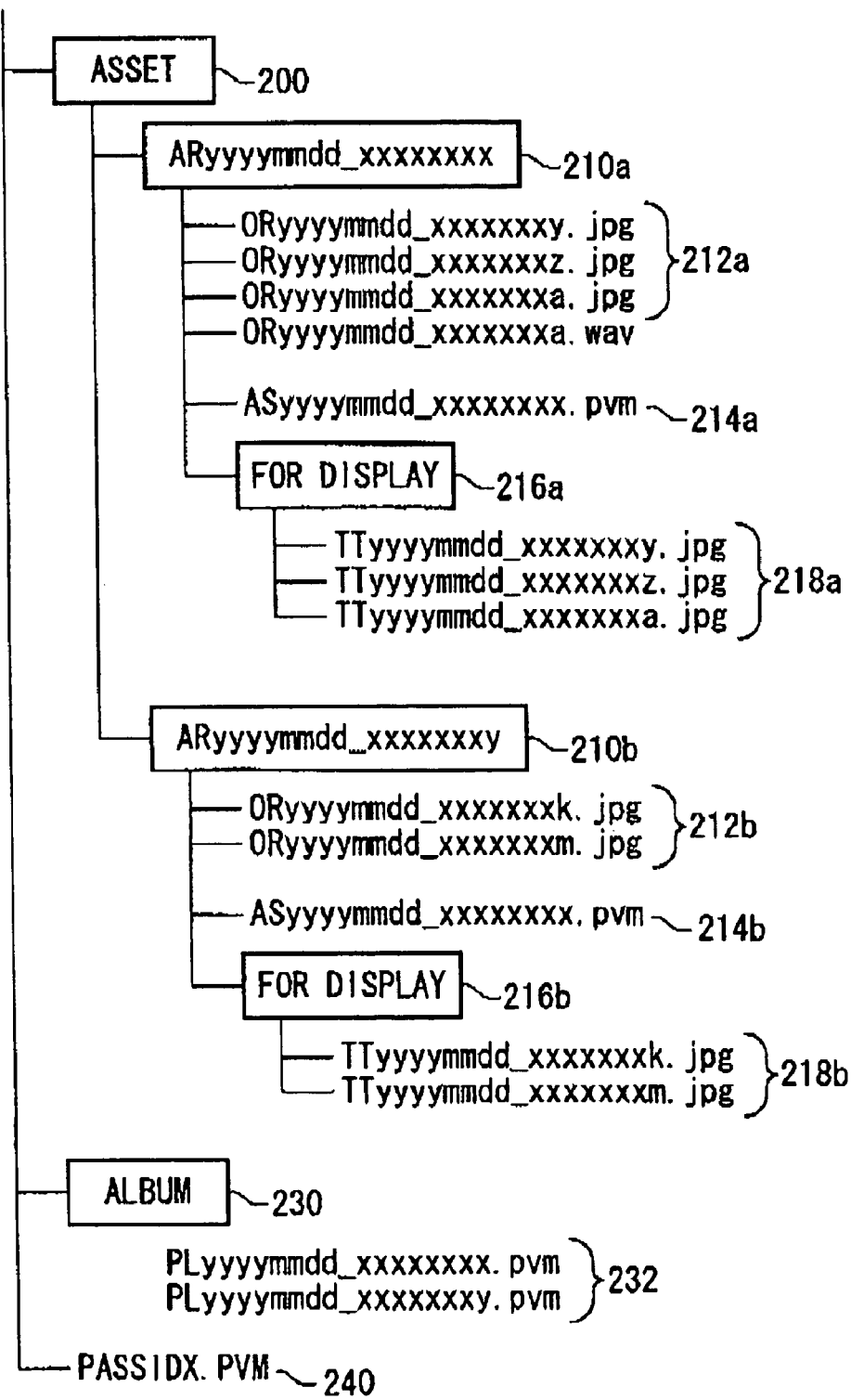
FIG. 2 is a view exemplary showing data structure of a recording medium.

FIG. 2 is a view exemplary showing data structure of the recording medium 20. The recording medium 20 according to the present embodiment is based on a standard making a recording medium record each of a plurality of image data of captured images that have been taken and an album information file as files different from each other. This standard is referred to as a Picture Archive And Sharing System standard, and is a unified standard devised by a plurality of fellow traders including an applicant. Specifically, the recording medium 20 stores an asset directory 200, an album directory 230, and an index file 240, right under a root directory. The asset directory 200 stores image data in a plurality of asset roll directories 210a and 210b (hereinafter, referred to as 210). In addition, in the present drawing, the asset directory 200 stores two asset roll directories 210. Alternatively, the asset directory 200 may store only one or three or more asset roll directories 210.

The asset roll directory 210a stores a plurality of image data 212a, an asset information file 214a, and an image directory for display 216a. Moreover, the asset roll directory 210a may further store a taped voice. The plurality of image data 212a may be, e.g., still images and moving images taken by the image capturing apparatus 30. The asset information file 214a stores passes to the plurality of image data 212a stored in the asset roll directory 210a. The image directory for display 216a is located at a low-order of the asset roll directory 210a and stores a plurality of images for display 218a. The plurality of images for display 218a is images to be displayed in place of the plurality of image data 212. For example, the plurality of images for display 218a may be images generated by lowering resolution of the plurality of image data. In addition, the asset roll directory 210a may store a plurality of image directories for display in which resolution or an aspect ratio of an image for display is different. In this way, although resolution or an aspect ratio is different every display apparatus and displaying method to be used when displaying an image for display, it is possible to display an image with a high display quality suitable for the display apparatus and the displaying method. Moreover, the asset information file 214a further stores passes to the plurality of images for display 218a.

The asset roll directory 210b stores a plurality of image data 212b, an asset information file 214b, and an image directory for display 216b on which a plurality of images for display 218b is stored. As shown in the present example, the recording medium 20 can classify the plurality of image data into the plurality of asset roll directories 210 to store them.

The album directory 230 stores a plurality of album information files 232 for respectively designating a display order of sets of image data different from one another. Specifically, the album information file 232 may store passes to the asset information files (214a and 214b, hereinafter referred to as 214) storing passes to the image data to be displayed and image identifiers each identifying the image data to be displayed, according to the display order. In addition, in this case, the asset information file 214 may store passes to the plurality of image data 212 and the image identifiers identifying the image data in association with each other.

Furthermore, the album information file 232 may record a preference degree of the image data designated by a user in association with the image data. A preference degree may be, e.g., a level of importance of an image that is expressed with five steps of relative evaluation. For example, an image of step one may be a memorial image to be semipermanently preserved, an image of step two may be an image that a user does not preserve in an album but hopes to see later, an image of step three may be an image that a user hopes to present if given the chance, an image of step four may be an image redundantly recorded because composition of the image resembles that of other images, and an image of step five may be an unnecessary image failed in image capturing. Alternatively, a preference degree may be an absolute reference showing a level of importance of an image with a percent mark.

The index file 240 stores passes to the plurality of asset information files 214 and passes to the plurality of album information files 232. In addition, the index file 240 is recorded on a predetermined pass that is not different for each recording medium 20. Specifically, the index file 240 may be recorded right under a root directory of the recording medium 20 with a file name of "PASSIDX.PVM".

In addition, at least a part of the asset directory 200, the asset roll directory 210, the plurality of image data 212, the asset information file 214, the image directories for display (216a and 216b, hereinafter referred to as 216), the plurality of images for display 218, the album directory 230, and the plurality of album information files 232, which are shown in the present drawing, may be different from one another by a format of the recording medium 20 predetermined by a user. Here, a format of the recording medium 20 may be, e.g., Fujicolor (a registered trademark) CD, PictureCD (a registered trademark), HotAlbum (a registered trademark), and so on.

In addition, the asset roll directory 210 may have a directory name capable of identifying each asset roll directory 210 of the plurality of recording media 20. Moreover, similarly, at least a part of the plurality of image data 212, the asset information file 214, the image directory for display 216, the plurality of images for display 218, the album directory 230, and the plurality of album information files 232, which are stored on the recording medium 20, may have names capable of identifying a file and a directory of each of the plurality of recording media 20.

Figure 3:
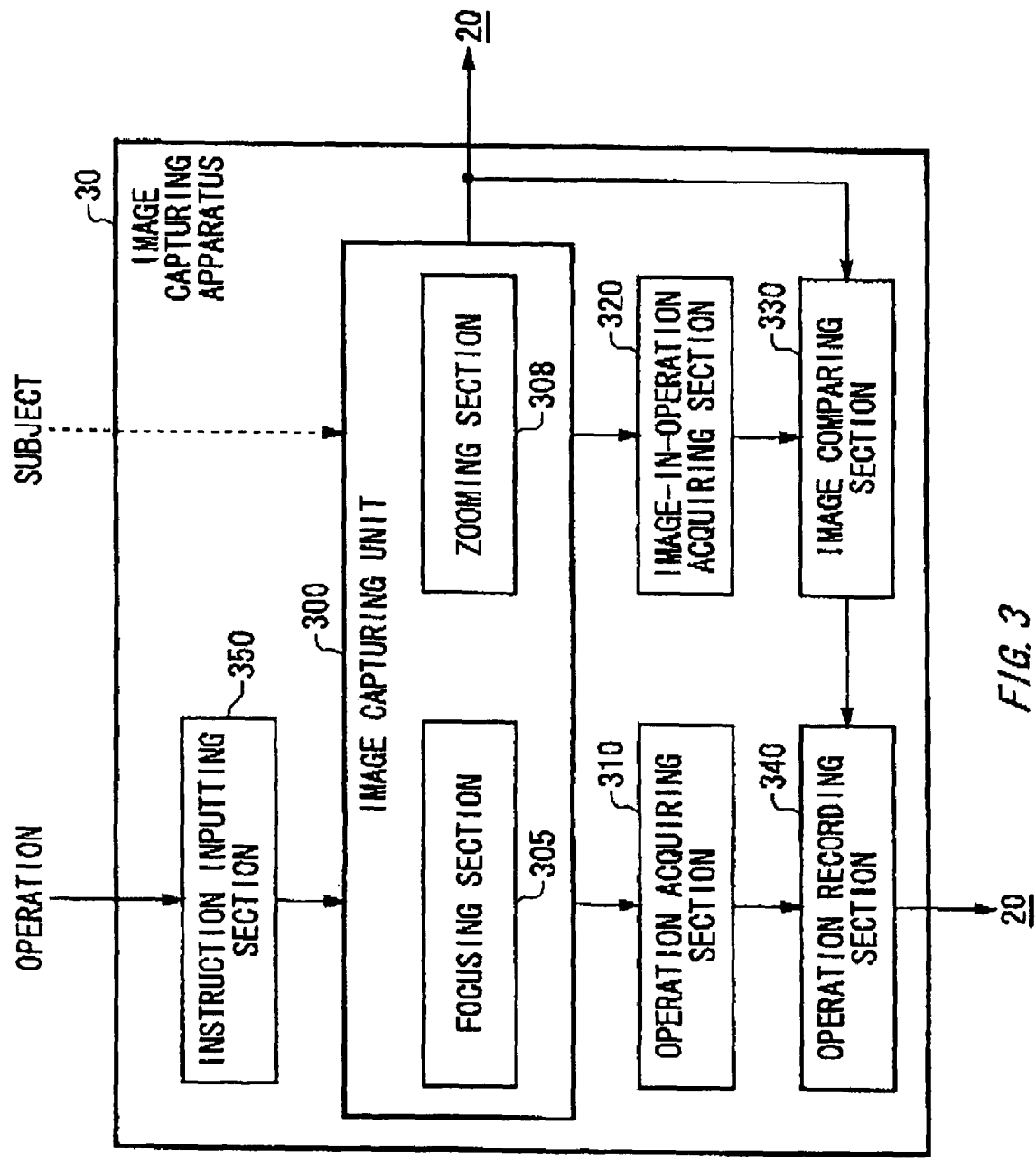
FIG. 3 is a functional block diagram showing a function of an image capturing apparatus.

FIG. 3 is a functional block diagram showing a function of the image capturing apparatus 30. The image capturing apparatus 30 has an image capturing unit 300, an operation acquiring section 310, an image-in-operation acquiring section 320, an image comparing section 330, an operation recording section 340, and an instruction inputting section 350. The image capturing unit 300 takes a subject according to an operation of a user of the image capturing apparatus 30, and records image data of a captured image in the recording medium 20. Moreover, the image capturing unit 300 performs a zoom, a focus, or the adjustment of a diaphragm according to an operation of a user. In the present embodiment, the image capturing unit 300 has a focusing section 305 and a zooming section 308. The focusing section 305 takes the focus of a captured image to be taken. The zooming section 308 changes a focal distance into a telescopic direction or a wide-angle direction.

The operation acquiring section 310 acquires an operation by a user before or after taking a captured image. The image-in-operation acquiring section 320 acquires an image-in-operation while the user operates the image capturing apparatus 30 before or after taking the captured image. The image comparing section 330 compares the captured image taken by the image capturing unit 300 and the image-in-operation acquired by the image-in-operation acquiring section 320. The operation recording section 340 records information on the operation in an album information file in the recording medium 20 in order to display the captured image with a level of importance according to the operation before or after taking the captured image, in association with the captured image to be displayed on the display apparatus 40. Preferably, the operation recording section 340 records information on the operation in the album information file on condition that a degree of coincidence between subjects of the captured image and the image-in-operation is not less than a predetermined reference value.

The image-in-operation acquiring section 320 continuously acquires a plurality of image-in-operations while the user operates the image capturing apparatus 30 before or after taking the captured image. Then, the image comparing section 330 compares image contents of the plurality of image-in-operations acquired by the image-in-operation acquiring section 320 to compute a degree of coincidence between the plurality of image-in-operations. Then, the operation recording section 340 records, in the album information file 232, operation information showing an operation while being taking an image-in-operation in which a degree of coincidence computed from the image comparing section 330 is not less than a predetermined reference value. For this reason, since the operation recording section 340 can record operation information after composition to be taken is approximately determined in the album information file 232, it is possible to record an operation of a user within a desirable operation period.

The instruction inputting section 350 accepts an instruction input from the user to the image capturing apparatus 30. The instruction inputting section 350 may be a release button that focuses the image capturing unit 300 on a subject located at a predetermined focusing point at a timing at which the user half-pushes the button and makes the image capturing unit 300 take an image at a timing at which the user all-pushes the button. Then, the operation acquiring section 310 acquires operations from the timing at which the instruction inputting section 350 accepts the instruction input to the timing at which the captured image is taken. For example, when the instruction inputting section 350 includes a release button, the operation acquiring section 310 acquires operations from the timing at which the instruction inputting section 350 accepts a half-push operation by the user to the timing at which the instruction inputting section 350 accepts an all-push operation by the user. For this reason, the operation recording section 340 can record an operation of a user for an appropriate period. In addition, an interval from the reception timing of the instruction input to the taken timing of the captured image may include the reception timing of the instruction input and the taken timing of the captured image.

Moreover, the operation recording section 340 may record operation information showing the subject specified by the operation acquiring section 310 in the album information file 232, in order to emphatically display the subject specified by the operation acquiring section 310 compared to other subjects. For example, the operation recording section 340 may record an image of the subject specified by the operation acquiring section 310 or a position of the subject in the image in the album information file 232, in order to zoom in and display the subject specified by the operation acquiring section 310 or a partial area including the subject.

The image-in-operation acquiring section 320 acquires an image-before-capturing before the user takes a captured image. Then, the image comparing section 330 compares the image-before-capturing acquired by the image-in-operation acquiring section 320 and the captured image taken by the image capturing apparatus 30. Then, the operation acquiring section 310 specifies a rotation amount of an image capturing area from the timing at which the image-in-operation is taken to the timing at which the captured image is taken, based on the comparison result by the image comparing section 330. The operation recording section 340 records operation information specifying the rotation amount specified by the operation acquiring section 310 in the album information file 232.

In this manner, the operation acquiring section 310 acquires a rotating operation of the image capturing apparatus 30 with respect to the image capturing area by the user of the image capturing apparatus 30 from before the captured image is taken. Then, the operation recording section 340 records operation information showing a rotating operation in the album information file 232, in order to rotate the image capturing apparatus 30 by a rotation amount of the image capturing apparatus 30 according to the rotating operation from before the captured image is taken to display the captured image, in association with the captured image to be displayed on the display apparatus 40.

In addition, the image-in-operation acquiring section 320 may continuously acquire the plurality of image-in-operations before the user takes the captured image. Then, the image comparing section 330 may compare a first image-in-operation and a second image-in-operation acquired by the image-in-operation acquiring section 320 at the timing before talking the captured image. Then, the operation acquiring section 310 may specify a rotation amount of the image capturing area for a period for which the rotation operation is continuously performed, from the timing before taking the captured image to the timing at which the captured image is taken, based on the comparison result by the image comparing section 330. Then, the operation recording section 340 may record operation information specifying the rotation amount specified by the operation acquiring section 310 in the album information file 232. In this way, the image capturing apparatus 30 can appropriately specify a period for which the rotating operation continues, to record a rotating operation for the period in the album information file 232.

Figure 4:
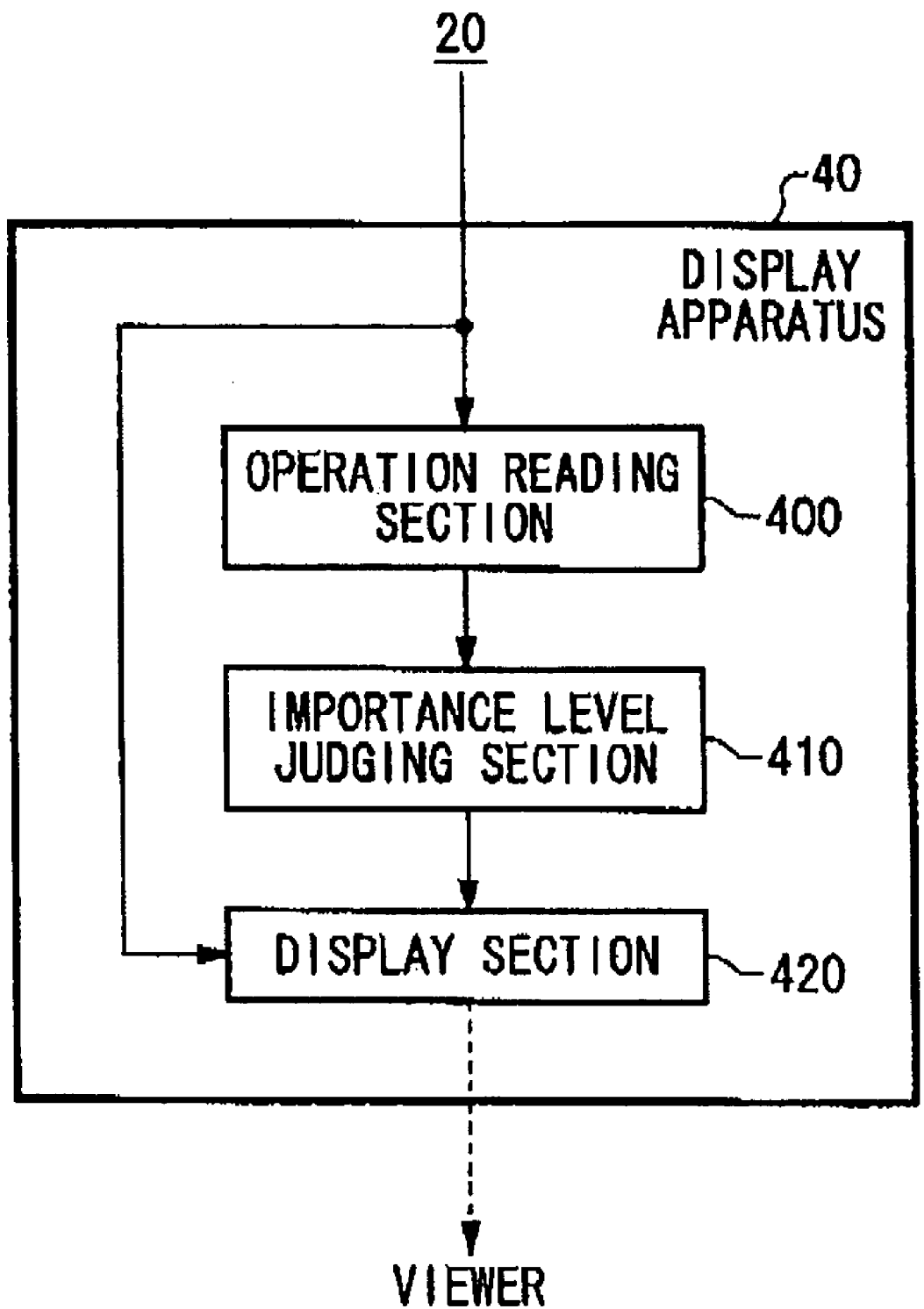
FIG. 4 is a functional block diagram showing a function of a display apparatus.

FIG. 4 is a functional block diagram showing a function of the display apparatus 40. The display apparatus 40 has an operation reading section 400, an importance level judging section 410, and a display section 420. The operation reading section 400 reads an operation by the user before or after taking the captured image, which is recorded by the image capturing apparatus 30 in the album information file in association with the captured image, for each captured image of which a display order is designated in the album information file. The importance level judging section 410 judges a level of importance of the captured image based on the read operation. The display section 420 respectively reads at least one captured image from the recording medium 20 to display the captured image(s) by a displaying method according to the level of importance of the captured image.

Figure 5:
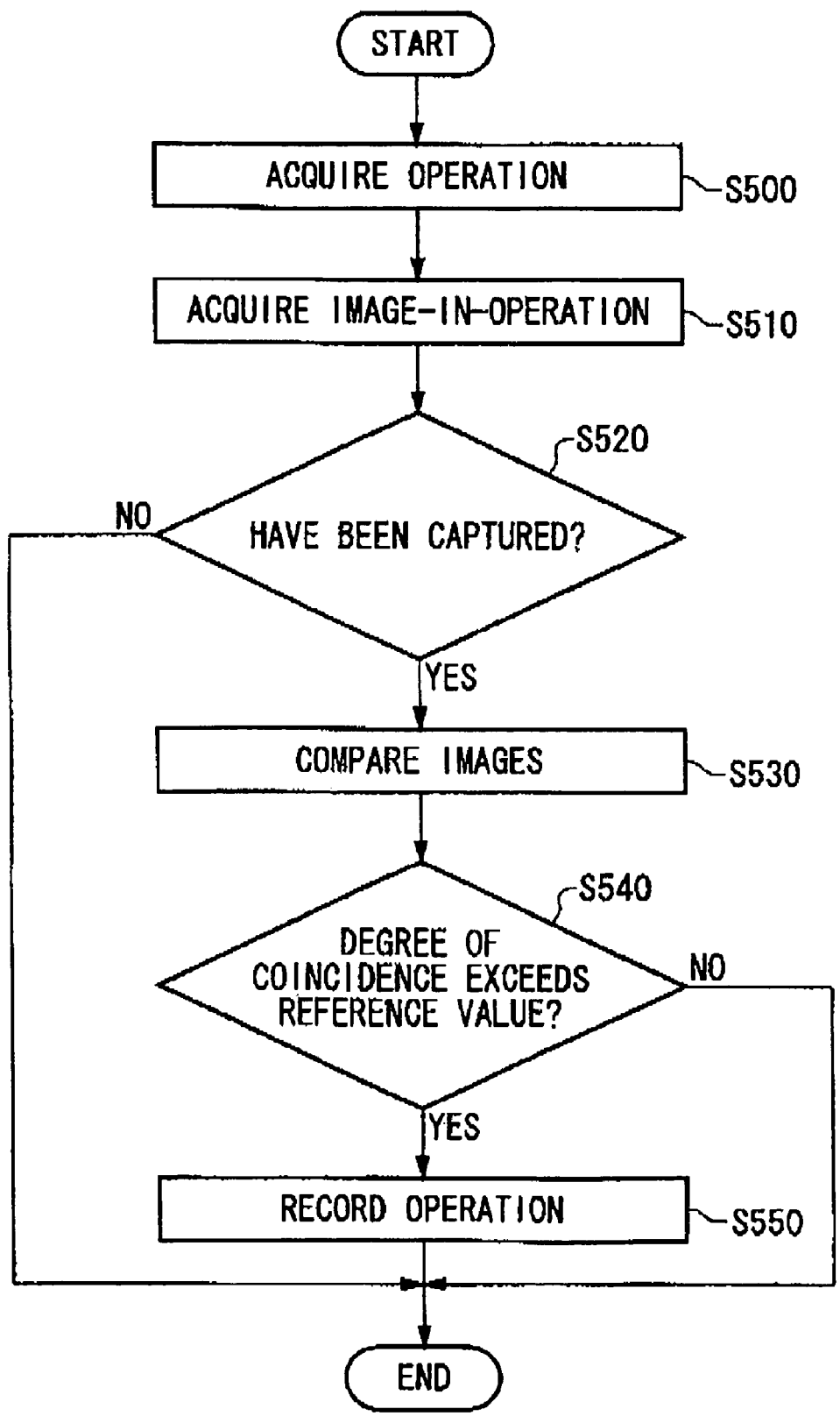
FIG. 5 is a view showing a flowchart of a process recording images taken by an image capturing apparatus.

FIG. 5 is a view showing a flowchart of a process for recording captured images taken by the image capturing apparatus 30. The image capturing apparatus 30 repeats, e.g., the following processes regularly. The operation acquiring section 310 acquires an operation for the image capturing apparatus 30 by a user of the image capturing apparatus 30 (S500). Specifically, the operation acquiring section 310 may specify a focused subject according to a focusing operation of the user and acquire information showing the specified subject. Moreover, the operation acquiring section 310 may specify a subject enlarged before or after image capturing according to a zoom-in operation after image capturing or a zoom-out operation before image capturing by the user of the image capturing apparatus 30, and acquire information showing the specified subject. Specifically, the operation acquiring section 310 may acquire an identification number of an object showing the subject in the captured image, or may acquire a coordinate value at which the object is located in the captured image.

Moreover, the operation acquiring section 310 may specify a subject caught in the center of the image capturing area by the user changing a direction of the image capturing apparatus 30 before or after image capturing among a plurality of subjects included in the image, and acquire information showing the specified subject. Moreover, the operation acquiring section 310 may acquire a time from when the user determines composition of an image to be taken to when the image is taken, or may acquire a time from when a power source of the image capturing apparatus 30 is turned on to when an image is first taken.

The image-in-operation acquiring section 320 acquires an image-in-operation while the user operates the image capturing apparatus 30 (S510). When an image of a subject is taken by the image capturing unit 300 (S520: YES), the image comparing section 330 compare the captured image and the image-in-operation (S530). Then, the operation recording section 340 records information on the operation (e.g., information specifying a subject) in the album information file (S550), on condition that a degree of coincidence between subjects of the captured image and the image-in-operation is not less than a predetermined reference value (S540: YES). In this case, it is preferable that the operation recording section 340 records information on an operation from a predetermined time prior to a captured time instant of the image to the captured time instant or an operation from the captured time instant of the image to a predetermined time posterior to the captured time instant, in the album information file. In this way, it is possible to record only an operation strongly related to taking the image in association with the image.

As details of operation information to be recorded, the operation recording section 340 may record, e.g., operation information specifying a focused subject in an album information file. In this case, the operation recording section 340 may further record, in the album information file, operation information showing that a level of importance of a focused subject is higher than that of other subjects in the image. In this way, it is possible to automatically specify an important figure as a subject at the image capturing time point even though a photograph is a group photograph in which a plurality of subjects is taken.

Moreover, the operation recording section 340 may record operation information specifying the subject enlarged by a zoom-in in the album information file. In this case, the operation recording section 340 may further record operation information showing that a level of importance of the enlarged subject is higher than that of other subjects in the album information file. By this example, it is possible to automatically specify an important figure as a subject at the image capturing time point even though a photograph is a group photograph in which a plurality of subjects is taken. Moreover, in another example, the operation recording section 340 may record operation information showing that a level of importance of a subject enlarged in the image taken before or after taking the captured image is higher than that of other subjects, among subjects appearing on this captured image.

As further another example, the operation recording section 340 may record the time from the determination of composition to the image capturing or the time from the supply of power source to the image capturing, which is acquired by the operation acquiring section 310. In this case, when the time acquired by the operation acquiring section 310 is longer, the operation recording section 340 may further record, in the album information file, operation information showing that the image is important compared to when the time is shorter.

In this way, it is possible to treat the image with a time necessary for preparing image capturing as an important image.

Figure 6A:
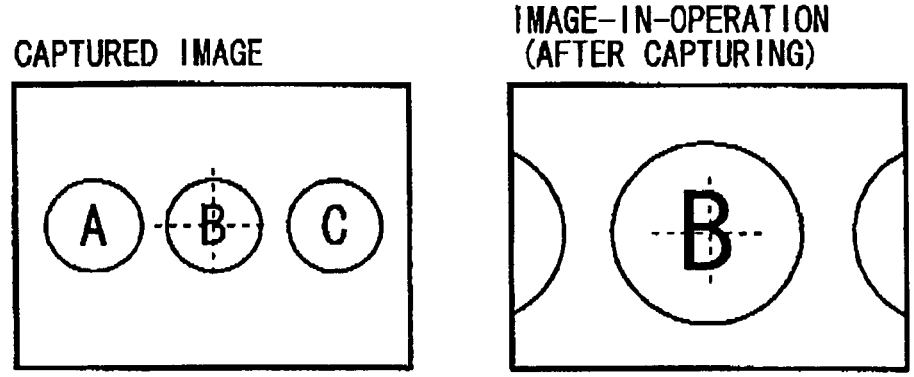
FIGS. 6A to 6C are views explaining an operation recorded on a recording medium as operation information.
Figure 6B:
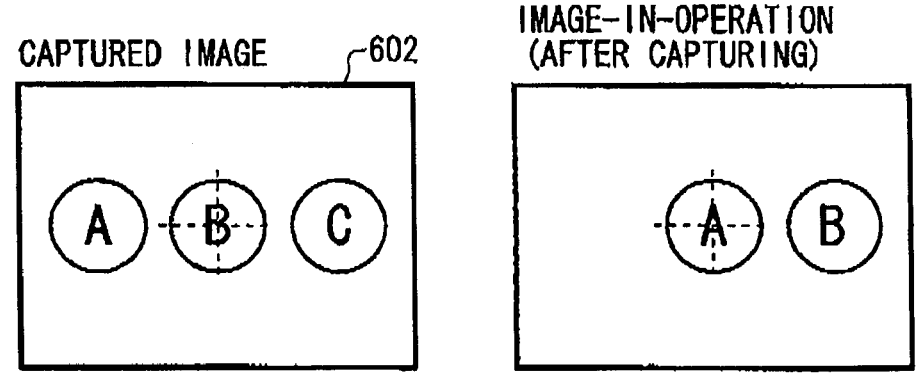
Figure 6C:
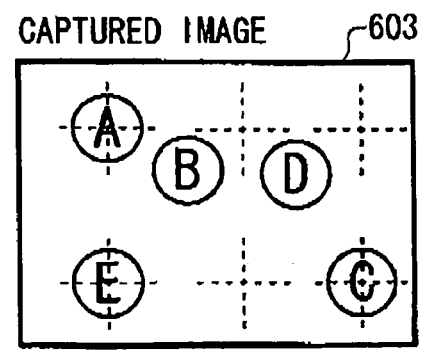

FIGS. 6A to 6C are views explaining an operation recorded on the recording medium 20 as operation information. FIG. 6A shows an image taken by the image capturing apparatus 30 in contrast to an image-in-operation when a zoom-in operation is performed after taking the image. Among A, B, and C that are subjects in the captured image, the subject B is enlarged in the image-in-operation after taking the image: As a result, the operation recording section 340 records operation information specifying B that is the enlarged subject in the album information file in association with the captured image including the subjects A, B, and C. In this way, it is easy to specify a subject that a user thinks to be important during capturing an image when editing the image later.

FIG. 6B shows an image taken by the image capturing apparatus 30 in contrast to an image-in-operation when changing a direction of the image capturing apparatus 30 after taking the image. Among A, B, and C that are subjects in the captured image, the subject A is caught in the center of an image capturing area in an image-in-operation after taking the image. As a result, the operation recording section 340 records operation information specifying the subject A caught in the center of the area in the album information file, in association with the captured image including the subjects A, B, and C. By this information, it is easy to specify a subject that a user thinks to be important during capturing an image when editing the image later.

FIG. 6C shows a plurality of focus positions provided in an image capturing area of the image capturing apparatus 30 and subjects caught in the image capturing area in contrast to each other. In an example of the present drawing, six focus positions are provided in the image capturing area, i.e., at four corners, a central upper part, and a central lower part. In this case, the operation acquiring section 310 acquires information showing a distance from each of these six focus positions to the subject as operation information. A measurement of these distances can be performed by a distance measuring function provided in the focusing section 305. Then, the operation recording section 340 records information showing these distances in the album information file.

For example, in the present drawing, subjects A to E are caught in an image capturing area for a captured image. Then, the subject A is caught at a focus position in the image capturing area, i.e., an upper-left corner, the subject C is caught at a focus position in the image capturing area, i.e., a lower-right corner, and the subject E is caught at a focus position in the image capturing area, i.e., a lower-left corner. In this way, the operation recording section 340 can record information showing a distance to each of the subjects A, C, and E in the album information file.

FIG. 7 is a view exemplary showing an operation of a designated operation of a subject by a half-push of a release button. The image-in-operation acquiring section 320 acquires image-in-operations 701, 702, 703 . . . , 711, 712, 713 . . . , and 721 by continuously acquiring images taken by the image capturing unit 300. In addition, the image-in-operations 701, 711, and 721 are images taken by the image capturing unit 300 at a timing at which a release button is half-pushed, in the state where predetermined focus positions (e.g., central positions in an image capturing range) are respectively overlapped on subjects A, E, and C.

Then, the image comparing section 330 compares a moved image obtained by moving one image-in-operation by predetermined movement width in an x direction and a y direction and the other image-in-operation, in two continuously taken image-in-operations, in order to compute a degree of coincidence between the image contents. Then, the operation acquiring section 310 specifies a moving direction and movement width, in which the highest degree of coincidence is computed, to specify a distance of the specified moving direction and movement width. In the present drawing, when shifting the image-in-operation 702 on the lower side of a y direction, it is possible to find movement width by which the image-in-operation 701 and the image-in-operation 702 have the highest degree of coincidence. In this way, the operation acquiring section 310 can judge that a moving operation for moving an image capturing direction in a lower direction has been performed. Similarly, the operation acquiring section 310 judges that a moving operation for moving an image capturing direction in a right direction has been performed based on the comparison result between image contents of the image-in-operation 711 and the image-in-operation 721 by the image comparing section 330. In this way, the operation acquiring section 310 can acquire a series of operations until the captured image is taken. A series of operations are to half-push a release button in the state where a focus position is determined on the subject A, to half-push the release button in the state where a focus position is determined on the subject E by moving an image capturing direction in a lower direction, and to farther half-push the release button in the state where a focus position is determined on the subject C by moving an image capturing direction in a right direction. Moreover, the operation acquiring section 310 can specify a moving speed of the image capturing direction based on the timing and distance at and by which each of the image-in-operations is taken.

Then, the operation recording section 340 records operation information showing a series of operations acquired by the operation acquiring section 310 in the album information file 232. Specifically, the operation acquiring section 310 records, in the album information file 232, operation information showing a moving direction and moving speed of an image capturing direction and a position of the subject on the captured image in which the release button is half-pushed, in order to display the operation information on the display apparatus 40 by means of a displaying method according to operation information. For example, the operation acquiring section 310 records the subject in which the release button is half-pushed in the album information file 232, in order to emphatically display the subject on the display apparatus 40.

In addition, the operation for acquiring an operation of the image capturing apparatus 30 including a moving operation of an image capturing direction as described above may start on condition that the release button is half-pushed and be continued until a captured image is acquired.

Figure 8:
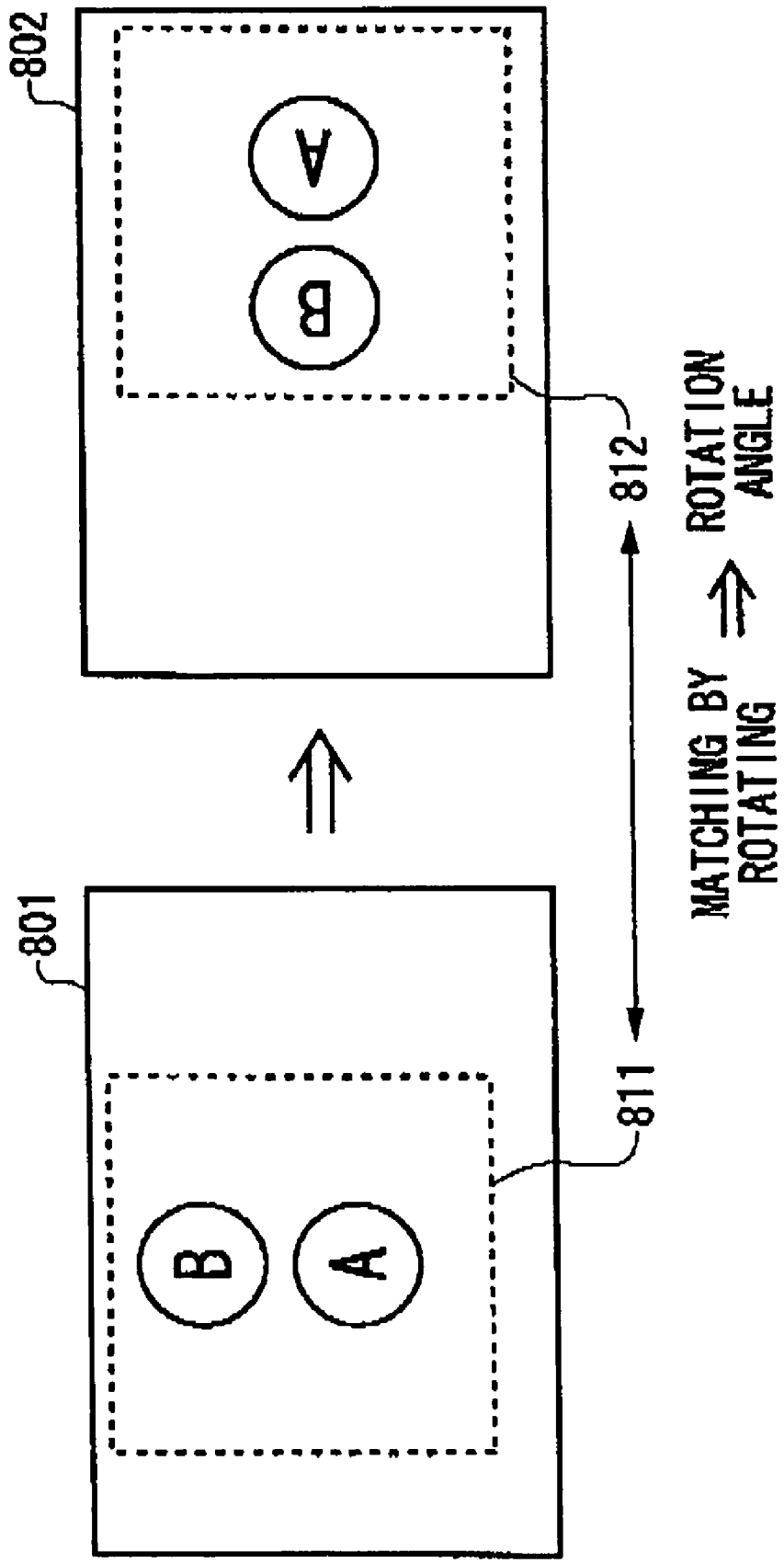
FIG. 8 is a view exemplary explaining a method for specifying a rotating operation.

FIG. 8 is a view exemplary showing a specification method for specifying a rotating operation of the image capturing apparatus 30. The image comparing section 330 compares a rotated image made by rotating an image-in-operation by a predetermined angle and a captured image 802. At this time, the image comparing section 330 compares the captured image and the rotated image while moving the captured image by a predetermined movement width, and computes a degree of coincidence between image contents. Then, the operation acquiring section 310 specifies an angle and movement width in which the highest degree of coincidence is computed.

In the present drawing, there are shown an image-in-operation 801 before rotating the image capturing apparatus 30 as an image capturing direction is kept generally constant and a captured image 802 after being rotated. Here, image contents obtained by rotating a partial image 811 of the image-in-operation 801 by 90 degrees in the left direction are generally identical with image contents of a partial image 812. For this reason, when the image comparing section 330 matches image contents of an image obtained by rotating the image-in-operation 801 by 90 degrees in the left direction with the captured image 802 while appropriately moving the captured image 802, it is possible to specify movement width in which the highest degree of coincidence is computed. In addition, the image comparing section 330 can specify a point on the captured image that becomes the center of rotation in a rotating operation of the image capturing apparatus 30 based on the specified movement width. Then, the operation recording section 340 may record the point that becomes the specified rotation center in the album information file 232.

In addition, in the example, there have been described operations for computing a rotation amount (e.g., an angle and movement width) by comparing an image-in-operation and a captured image by the image comparing section 330. However, a rotation amount between continued image-in-operations can be specified by comparing image-in-operations, which are continuously acquired, by the image comparing section 330. In this way, the operation acquiring section 310 can specify a period for which a rotating operation is continued, and can further specify a rotation amount in the period and a temporal change of the rotation amount. Then, the operation recording section 340 may record the specified rotation amount and the temporal change of rotation amount in the album information file 232.

In addition, the operation by which the operation acquiring section 310 acquires a rotating operation is started on condition that composition is determined and is continued until a captured image is acquired. In addition, the operation acquiring section 310 may detect that composition is determined when a release button is half-pushed. Moreover, the operation acquiring section 310 may detect that composition is determined when a degree of coincidence of image contents specified by the image comparing section 330 between continued image-in-operations acquired by the image-in-operation acquiring section 320 is larger than a predetermined reference value.

Figure 9:
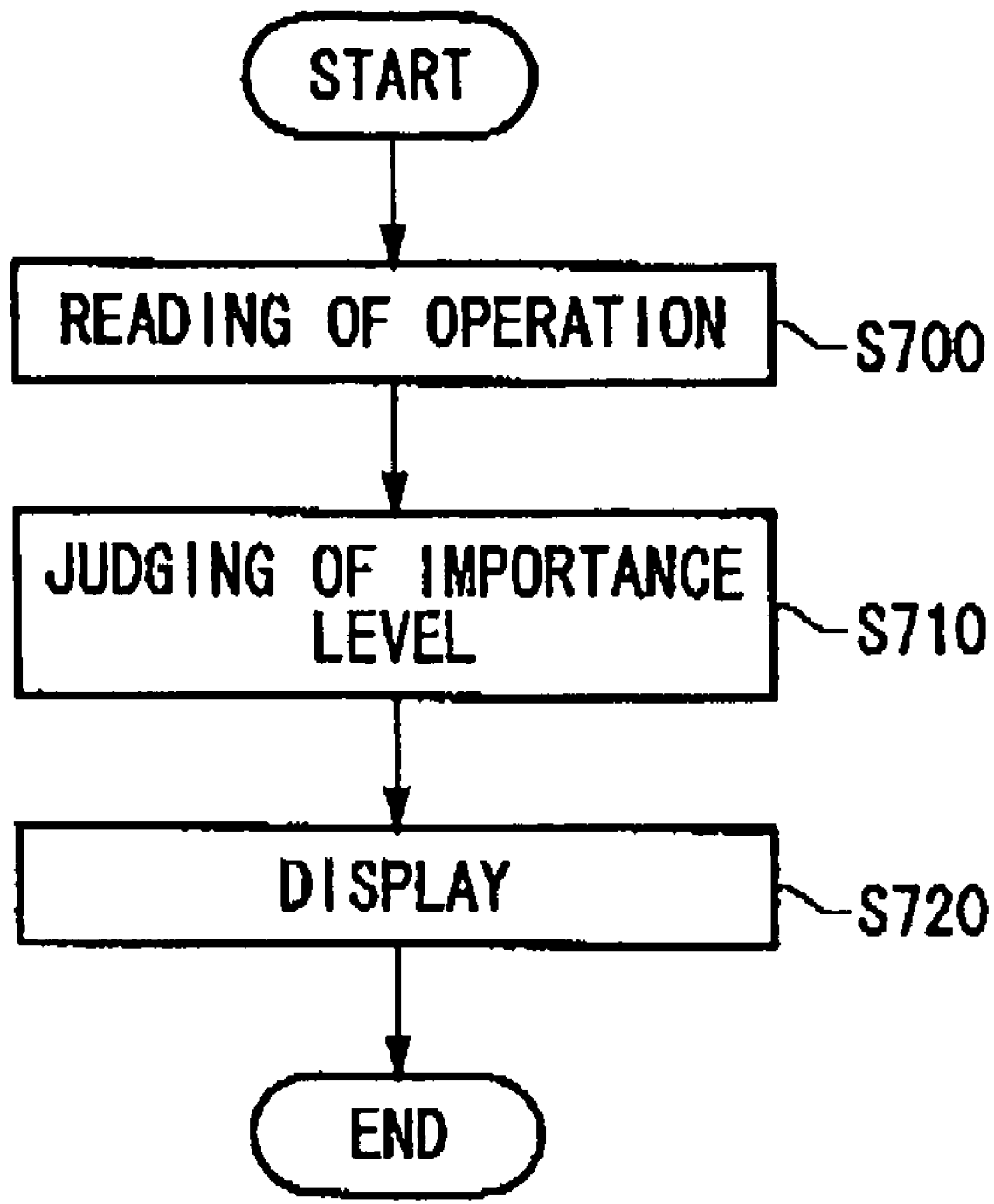
FIG. 9 is a view showing a flowchart of a process by which a display apparatus reads and displays images.

FIG. 9 is a view showing a flowchart of a process by which the display apparatus 40 reads and displays an image. The operation reading section 400 reads an operation before or after talking an image by a user, which is recorded in the album information file in association with the image by the image capturing apparatus 30, for each image of which a display order is designated in the album information file (S700). The importance level judging section 410 judges a level of importance of the image based on the read operation (S710).

The display section 420 reads each of at least one image from the recording medium 20 to display the images by a displaying method according to a level of importance of the image (S720). For example, the display section 420 may display an image of which a level of importance is not less than a reference more largely than other images when arranging and displaying a plurality of images. Furthermore, the display section 420 may change a time displaying the image according to a level of importance. For example, when a level of importance is higher, the display section 420 may lengthen a time displaying the image compared to when a level of importance is low. Furthermore, the display section 420 may change sound volume of a voice being replayed while displaying the image according to a level of importance of the image. For example, when a level of importance of the image is higher, the display section 420 may increase sound volume of a voice to be replayed compared to when a level of importance is low. In this way, it is possible to perform appropriate presentation based on image capturing circumstances during replaying an image.

Figure 10:
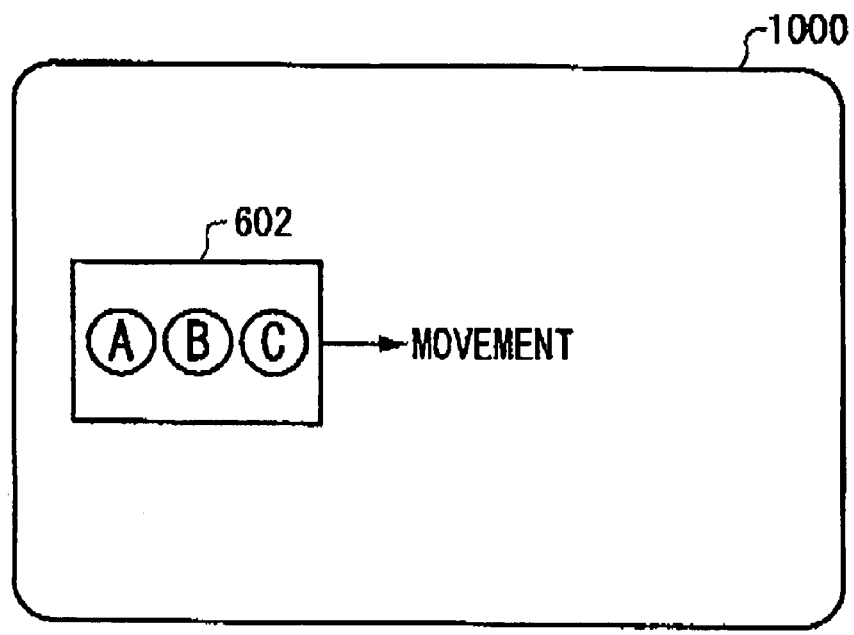
FIG. 10 is a view showing a display example of images by a display apparatus.

FIG. 10 is a view exemplary showing a display example displaying an image in S720 shown in FIG. 9. In the present drawing, there is described a display example in which an image 602 is displayed on a display screen 1000 and then is moved in a constant direction until the image 602 disappears from a display area on the display screen 1000. It is assumed that the effect that an important subject A is located on the left side of the image 602 is recorded in the album information file 232. At this time, the display section 420 determines a displaying method for displaying the image 602 while moving it based on a position of the important subject A in the image 602. Specifically, the display section 420 displays the image 602 on the left side of the display screen 1000 and then moves and displays the image in a right direction. When this is done, since the important subject A is displayed on the display screen 1000 for a longer time than other subjects B and C, a viewer can see the important subject A for a longer time. In addition, since a display example as described above is a mere example, the display section 420 may display an image in various display aspects according to a level of importance of the image or a position of an important subject in the image.

Figure 11:
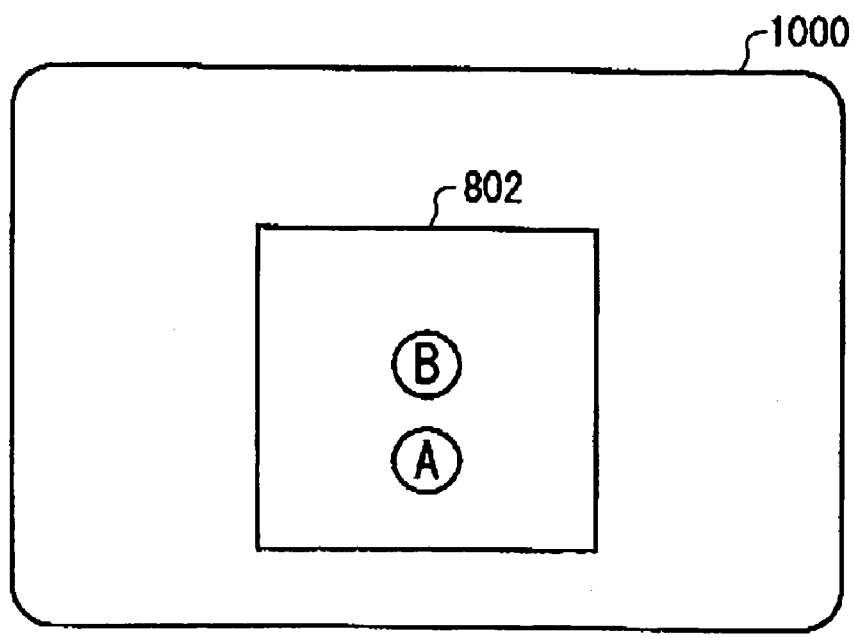
FIG. 11 is a view showing another display example of images by a display apparatus.

FIG. 11 is a view exemplary showing a display example by which an image taken by the image capturing apparatus 30 by a rotating operation is displayed. The display section 420 rotates an image 802 by a rotation amount specified by the operation acquiring section 310 to display the rotated image. In addition, when the image capturing apparatus 30 specifies angular velocity of a rotation and records the specified angular velocity in the album information file 232, the display section 420 may display the image 802 according to the recorded angular velocity. For example, the display section 420 may display the image 802 while rotating the image 802 with angular velocity in proportion to the angular velocity recorded in the album information file 232.

As above, according to the image managing system 10 of the present embodiment, it is possible to appropriately expects a level of importance of an image determined by subjectivity of a user to record the level of importance in association with the image. Moreover, it is possible to specify a subject that a user has thought to be important during capturing an image among a plurality of subjects taken in one image to record the subject in association with the image. In this way, although a person different from the user edits an image or the user edits an image after a constant time from image capturing, it is possible to appropriately edit images in consideration of circumstances in image capturing. Furthermore, it is possible to perform an appropriate presentation process based on circumstances in image capturing when displaying and replaying images.

Figure 12:
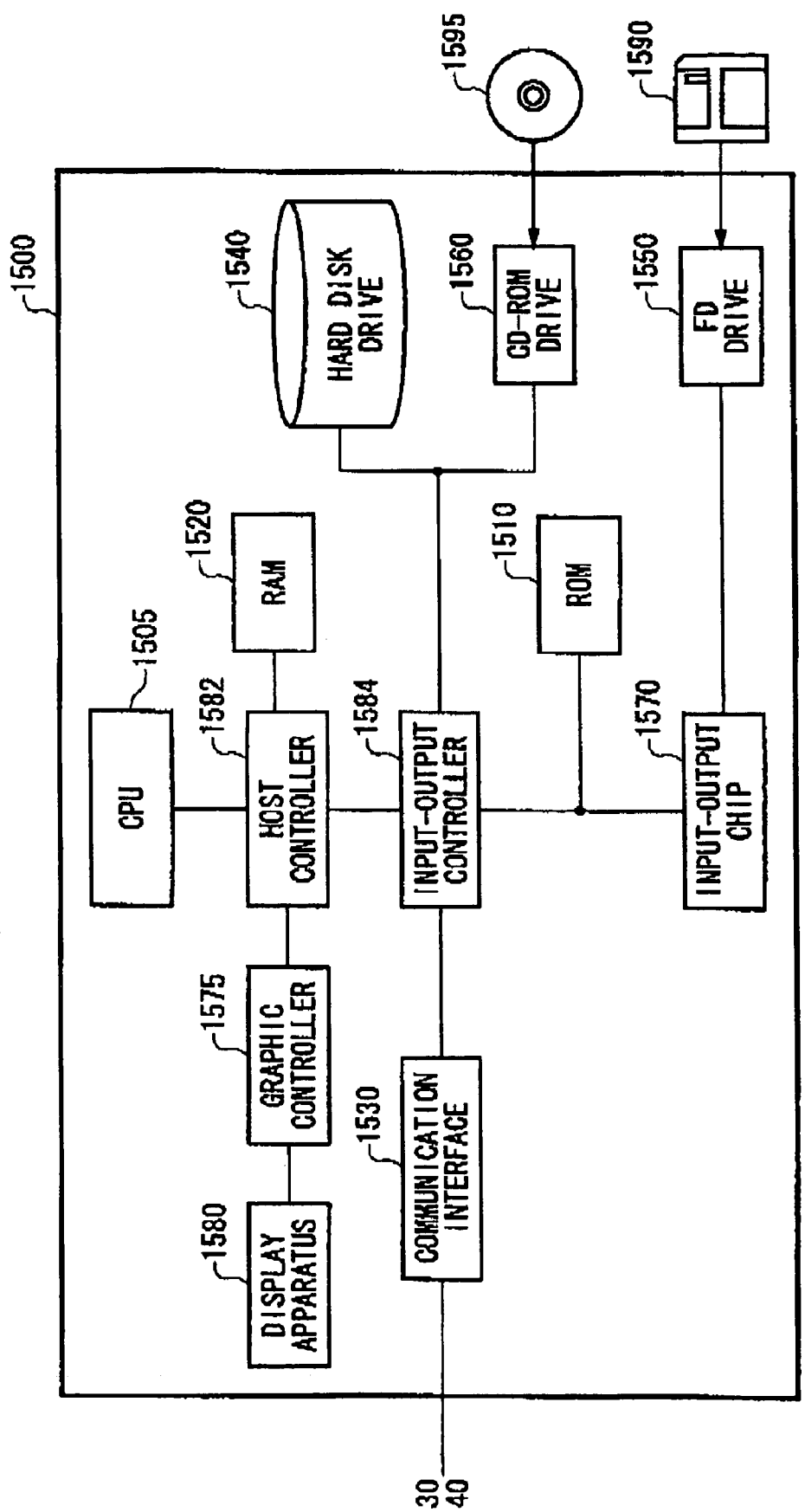
FIG. 12 is a view exemplary showing a hardware configuration of a computer according to an image capturing apparatus and a display apparatus.

FIG. 12 is a view exemplary showing a hardware configuration of a computer 1500 according to the image capturing apparatus 30 and the display apparatus 40 of the present embodiment. The computer 1500 includes a CPU peripheral section having a CPU 1505, a RAM 1520, a graphic controller 1575, and a display apparatus 1580 that are connected to one another by a host controller 1582, an input-output section having a communication interface 1530, a hard disk drive 1540, and a CD-ROM drive 1560 that are connected to the host controller 1582 by an input-output controller 1584, and a legacy input-output section having a ROM 1510, a flexible disk drive 1550, and an input-output chip 1570 that are connected to the input-output controller 1584.

The host controller 1582 connects the RAM 1520 to the CPU 1505 and the graphic controller 1575 for accessing the RAM 1520 at high transfer rate. The CPU 1505 operates based on a program stored on the ROM 1510 and the RAM 1520 to control each section. The graphic controller 1575 acquires image data generated by the CPU 1505 on a frame buffer provided in the RAM 1520, and displays the data on the display apparatus 1580. Alternatively, the graphic controller 1575 may include therein the frame buffer storing the image data generated from the CPU 1505.

The input-output controller 1584 connects the host controller 1582 to the hard disk drive 1540, the communication interface 1530, and the CD-ROM drive 1560 that are a comparatively fast input-output apparatus. The hard disk drive 1540 stores a program and data to be used by the CPU 1505 in the computer 1500. The communication interface 1530 communicates with the image capturing apparatus 30 and the display apparatus 40 via a network, and provides the program and data to the image capturing apparatus 30 and the display apparatus 40. The CD-ROM drive 1560 reads a program or data from a CD-ROM 1595, and provides the program or data to the hard disk drive 1540 and the communication interface 1530 via the RAM 1520.

Moreover, the ROM 1510, the flexible disk drive 1550, and the input-output chip 1570 that are a comparatively low-speed input-output apparatus are connected to the input-output controller 1584. The ROM 1510 stores a boot program to be executed during starting the computer 1500, a program dependent on hardware of the computer 1500, or the like. The flexible disk drive 1550 reads a program or data from a flexible disk 1590, and provides the program or data to the hard disk drive 1540 and the communication interface 1530 via the RAM 1520. The input-output chip 1570 connects the flexible disk drive 1550 to various kinds of input-output apparatuses via a parallel port, a serial port, a keyboard port, a mouse port, or the like.

A program provided to the communication interface 1530 via the RAM 1520 is stored on a recording medium such as the flexible disk 1590, the CD-ROM 1595, or an IC card in order to be provided by a user. The program is read from the recording medium, is provided to the communication interface 1530 via the RAM 1520, and is sent to the image capturing apparatus 30 and the display apparatus 40 via a network. The program sent to the image capturing apparatus 30 and the display apparatus 40 is installed and executed in the image capturing apparatus 30 and the display apparatus 40.

The program installed and executed in the image capturing apparatus 30 makes the image capturing apparatus 30 function as the image capturing unit 300, the operation acquiring section 310, the image-in-operation acquiring section 320, the image comparing section 330, the operation recording section 340, and the instruction inputting section 350, which have been described with reference to FIGS. 1 to 11. Moreover, the program installed and executed in the display apparatus 40 makes the display apparatus 40 function as the operation reading section 400, the importance level judging section 410, and the display section 420, which have been described with reference to FIGS. 1 to 11.

The above described program may be stored on an outside recording medium. A recording medium can include an optical recording medium such as DVD or PD, a magneto-optical recording medium such as MD, a tape medium, or a semiconductor memory such as an IC card in addition to the flexible disk 1590, the CD-ROM 1595. Moreover, a storage device such as a hard disk or a RAM provided in a server system connected to a private communication network or an Internet may be used as a recording medium, and the program may be provided to the computer 1500 via the network.

Although the present invention has been described by way of an exemplary embodiment, it should be understood that those skilled in the art might make many changes and substitutions without departing from the spirit and the scope of the present invention. It is obvious from the definition of the appended claims that embodiments with such modifications also belong to the scope of the present invention.

What is claimed is:

1. An image capturing apparatus that records a plurality of captured images and an album information file for designating a display order making a display apparatus display at least one the captured image in a recording medium as files different from each other, the image capturing apparatus comprising:

an operation acquiring section that acquires an operation before or after a user of the image capturing apparatus takes, by a camera, the captured images;

an operation recording section that records operation information showing the operation in the album information file in order to display the captured image with a level of importance according to the operation before or after capturing the captured image, in association with the captured image to be displayed on the display apparatus;

an image-in-operation acquiring section that continuously acquires a plurality of image-in-operations while the user operates the image capturing apparatus before or after capturing the captured image; and an image comparing section that compares image contents of the plurality of image-in-operations acquired by said image-in-operation acquiring section to compute a degree of coincidence between the plurality of image-in-operations, and said operation recording section records operation information showing the operation in the album information file while an image-in-operation in which the degree of coincidence computed from said image comparing section is not less than a predetermined reference value is taken, wherein said operation recording section records, in the album information file, information for the operation from a predetermined time prior to a captured time instant of the captured image to the captured time instant or the operation from the captured time instant to a predetermined time posterior to the captured time instant, and wherein said degree of coincidence is determined by a moving direction and a movement width of said image before or after the user takes the captured images.

* * * * *